United States Patent Office 2,758,140
Patented Aug. 7, 1956

2,758,140
NONCATALYTIC CONDENSATION OF AROMATIC COMPOUNDS WITH UNSATURATED HYDROCARBONS

Vladimir N. Ipatieff, deceased, late of Chicago, Ill., by Vladimir Haensel, Hinsdale, Herman Pines, Chicago, and Vincetta Kibort, Chicago, Ill., executors, and Herman Pines and Bruno Kvetinskas, Chicago, Ill., assignors to Universal Oil Products Company, Des Plaines, Ill., a corporation of Delaware No Drawing. Application July 27, 1953,
Serial No. 370,611

20 Claims. (Cl. 260—668)

This application is a continuation-in-part of my co-pending application Serial No. 152,991, filed March 30, 1950, now abandoned.

This invention relates to the condensation of unsaturated hydrocarbons with aromatic compounds, and to the products and derivatives of products thereby produced. It is more particularly concerned with the condensation of unsaturated hydrocarbons with carbocyclic or heterocyclic aromatic ring compounds having attached to a nuclear carbon atom, a saturated carbon atom to which is attached at least one hydrogen atom.

The condensation of aromatic compounds with unsaturated hydrocarbons, such as the alkylation of aromatic hydrocarbons with olefins, has been the subject of extensive investigations over a considerable period of time. These investigations have led to the discovery of various catalysts of one type or another to induce the reaction and to aid the selectivity thereof. In these reactions, up to a very recent time, nuclear condensation was all that was effected. For example, in the catalytic alkylation of aromatic compounds having attached to a carbon atom of the ring a saturated carbon atom to which is attached at least one hydrogen atom, the alkylation being carried out in the presence of an alkylation catalyst, the entering alkyl group carbon atom attaches to the aromatic nucleus. Very recently it has been shown that in the presence of metallic sodium, the alkyl group is introduced into the side chain. This latest step forward in the art, however, suffers from certain inherent disadvantages. First of all, the catalyst, sodium, is difficult to handle and tends to form complexes with the unsaturated hydrocarbons utilized, which complexes are pyrophoric and in some instances explosive in character. Furthermore, sodium is at the present time a relatively expensive chemical. Sodium also suffers from the disadvantage that it becomes rapidly deactivated when used as a catalyst and thus, commercially, catalyst costs become exorbitant. It is necessary to use relatively large amounts of this catalyst over fairly short periods of time to obtain satisfactory yields of side chain alkylated products. When utilized, pressures from about 50 to about 3,000 atmospheres and temperatures from about 150 to 450° C. are common. The high cost and difficulty in handling sodium as a catalyst are overcome by utilization of the process of the present invention. Furthermore, the art of using sodium is limited to the use of ethylene as the only operable olefin. Our invention is widely applicable to many various unsaturates as will be hereinafter set forth. We have invented a method of accomplishing side chain alkylation in which a catalyst is no longer necessary. Furthermore, we can carry out this noncatalytic reaction with little or no formation of carbon or other undesirable materials, and thus operate in a continuous manner. Surprisingly, this noncatalytic reaction can be carried out at temperatures and pressures within the range heretofore specified for the use of a side chain alkylation catalyst, namely, sodium. Thus, we have found that at pressures over about 67 atmospheres, and at temperatures from about 350–500° C., and at hourly liquid space velocities of from about 0.1 to about 10, side chain alkylation takes place in good yields and with negligible or no carbon formation. This lack of carbon formation is not only interesting, but makes this process economically feasible when coupled with the conditions utilized and the yields of products obtained. It has also been demonstrated that thermal reactions in a high pressure autoclave, a batch process, such as between toluene and amylenes, result in the formation of large amounts of carbon. It is indeed surprising, as we have found, that when the reaction is carried out under temperature and pressure conditions in which a catalyst was formerly utilized, and in continuous manner, that there is no carbon formation. Thus, our invention must proceed through different steps than shown in the prior art.

It is an object of this invention to condense an unsaturated hydrocarbon with an aromatic compound selected from the group consisting of carbocyclic and heterocyclic ring compounds having attached to a nuclear carbon atom, a saturated carbon atom to which is attached at least one hydrogen atom.

It is another object of this invention to condense, in the absence of added catalyst, an unsaturated hydrocarbon with an aromatic compound selected from the group consisting of carbocyclic and heterocyclic ring compounds having attached to a nuclear carbon atom, a saturated carbon atom to which is attached at least one hydrogen atom.

Still another object is to noncatalytically condense a hydrocarbon selected from the group consisting of olefinic and acetylenic hydrocarbons, with an aromatic hydrocarbon possessing a side chain, said side chain containing an alpha carbon atom to which is attached a hydrogen atom.

A further object of this invention is to provide a process for the side chain alkylation of alkylaromatic hydrocarbons.

A still further object of this invention is to provide a method for producing aromatic compounds containing long straight hydrocarbon side chains, said compounds being useful in the production of detergents, wetting agents, and the like.

In a broad aspect, our invention comprises condensing an unsaturated hydrocarbon with an aromatic compound, particularly an aromatic compound having attached to the nucleus a saturated carbon atom to which is attached at least one hydrogen atom, in the absence of added catalyst. This condensation is effected by compressing in the absence of external heating, an aromatic compound and an unsaturated hydrocarbon to superatmospheric pressures, and thermally and noncatalytically reacting said compounds. We sometimes refer to this type of reaction as thermal condensation or thermal alkylation. Our invention also includes the preparation of alkylaromatic compounds of particular structural configurations, useful per se or as starting materials for the preparation of various other chemical substances.

In a broad embodiment, our invention relates to a process which comprises noncatalytically reacting an unsaturated hydrocarbon with an aromatic compound selected from the group consisting of carbocyclic and heterocyclic aromatic ring compounds having attached to a nuclear carbon atom, a saturated carbon atom to which is attached at least one hydrogen atom at condensation conditions.

In a more specific embodiment our invention relates to a process for producing a side chain alkylated aromatic compound which comprises compressing, in the absence of external heating, an unsaturated hydrocarbon and an aromatic compound selected from the group consisting of carbocyclic and heterocyclic ring compounds having attached to a nuclear carbon atom, a saturated carbon atom to which is attached at least one hydrogen atom, the mol ratio of aromatic compound to unsaturated hydrocarbon being greater than about 1.0, thereafter thermally and noncatalytically reacting the unsaturated hydrocarbon with the aromatic compound at the saturated carbon atom, said reaction being carried out at a pressure greater than about 1,000 p. s. i., at a temperature from about 350° to about 500° C., and at an hourly liquid space velocity from about 0.1 to about 10, and thereafter recovering the side chain alkylated resultant product.

In another specific embodiment our invention relates to a process which comprises reacting an aromatic compound having the following structure:

where A represents an aromatic radical having a carbocyclic nucleus and R represents hydrogen or an organic radical attached to the indicated alpha carbon atom through a saturated carbon atom, with a compound selected from the group consisting of olefinic and acetylenic hydrocarbons at condensation conditions, the condensation conditions including compressing, in the absence of external heating, said reactants, containing a molar excess of aromatic compounds thereafter thermally and noncatalytically subjecting said compounds to reaction at a pressure greater than about 1,000 p. s. i., at a temperature from about 350° to about 500° C., and at an hourly liquid space velocity from about 0.1 to about 10, to effect condensation of the unsaturated hydrocarbon with the carbocylic aromatic compound at said saturated carbon atom.

In still another embodiment, our invention relates to a process for producing side chain alkylated aromatic hydrocarbons which comprises compressing, in the absence of external heating, an unsaturated hydrocarbon and an alkylaromatic hydrocarbon having a hydrogen atom attached to the alpha carbon atom, said mixtue containing a molar excess of the alkylaromatic hydrocarbons, thereafter thermally and noncatalytically reacting said unsaturated hydrocarbon with the alkylaromatic hydrocarbon at the saturated carbon atom at a pressure greater than about 1,000 p. s. i., at a temperature of from about 350° to about 500° C., and at an hourly liquid space velocity from about 0.1 to about 10, and thereafter recovering the side chain alkylated resultant products.

The compounds with which unsaturated hydrocarbon atoms are condensed in our process comprise aromatic compounds having attached to a nuclear carbon atom a saturated carbon atom to which is attached at least one hydrogen atom. By the term aromatic compound we mean to include not only alkylbenzene, alkylnaphthalenes, and derivatives thereof, but also all compounds containing a stable ring or nucleus such as is present in benzene, and which possess unsaturation in the sense that benzene does. Consequently, it can be seen that the term aromatic compound, in the sense in which it is used in the specification and appended claims, not only includes carbocyclic compounds, but also hereterocyclic compounds having stable nuclei. The carbocyclic compounds may have a benzene, naphthalene, anthracene, etc., nucleus and the heterocyclic aromatic ring compounds contemplated for use in our process may contain both a carbocyclic and a heterocyclic ring such as is found in indole and carbazole. Also, the aromatic compounds may contain both a benzene nucleus and a cycloalkane nucleus such as is found in tetralin and in indan.

As hereinbefore stated, the aromatic compounds preferred for use in our process, contain a side chain attached to a nuclear carbon atom by a saturated carbon atom, i. e., a carbon atom that is bonded by univalent bonds to four atoms or groups. The saturated carbon atom should have at least one hydrogen atom attached thereto. These requisites are desirable for the reason that aromatic compounds such as tert-butylbenzene, which does not have a hydrogen atom attached to the alpha carbon atom, shows very little tendency under the conditions of operation employed in our process to undergo condensation of the type herein taught. Similarly, styrene, in which the alpha carbon atom in the side chain is unsaturated, does not condense with the unsaturated hydrocarbons in the manner herein specified. Thus the preferred aromatic compounds are those in which the alpha carbon atom of the side chain is saturated, and in which said saturated alpha carbon atom has at least one hydrogen atom attached thereto. The chain may comprise only one carbon atom as the methyl group in toluene, or it may comprise a number of carbon atoms in straight chain or branched chain relation such as the n-butyl radical or the isobutyl radical in n-butylbenzene and isobutylbenzene, respectively. The chain need not necessarily be an aliphatic chain; it may be a cycloalkane ring such as in tetralin or indan or as in cyclohexylbenzene.

Suitable alkylaromatic hydrocarbons include toluene, ethylbenzene, n-propylbenzene, cumene, normal, iso, and secondary butylbenzene, methylnaphthalene, and the like. Other suitable aromatic hydrocarbons include tetralin, indan, diphenylmethane, cyclopentylbenzene, cyclohexylbenzene, and methyl ethylbenzene.

The aromatic ring in the compounds herein referred to may contain other substituents such as a halo group, an alkoxy group such as methoxy and ethoxy, a nitro group, etc., in addition to containing one or more suitable aliphatic substituents.

The aromatic reactants employed in our process are condensed with unsaturated hydrocarbons. Two preferred classes of unsaturated hydrocarbons comprise organic hydrocarbons containing an ethylenic group and organic hydrocarbons containing an acetylenic group. For the purpose of our invention, aromatic compounds such as benzene are not regarded as being unsaturated. Examples of unsaturated hydrocarbons suitable for use in our process include olefins such as ethylene, propylene, 1-butene, 2-butene, isobutylene, 1-octene, 1-decene, 1-dodecene, propylene tetramer, nonenes, etc.; dienes such as butadiene, isoprene, and allene, etc.; polyolefins containing more than two pairs of double bonds per molecule; cycloolefins, and cyclodienes, such as cyclopentene, cyclohexene, methylcyclohexene, cyclopentadiene, etc.; and acetylenic hydroarbons such as acetylene, methylacetylene, phenylacetylene, and the like.

The combination of condensation conditions, including compressing the reactants in the absence of external heating and then thermally and noncatalytically subjecting said reactants to an elevated pressure and temperature, at specific space velocities are important variables in our process. When the process is carried out, for example, by sealing the reactants in a high pressure autoclave followed by heating to the desired temperature, large amounts of carbon are formed. In such a process, the pressure developed is dependent solely on the temperature utilized, the mol fractions of reactants present, and the internal volume of the autoclave utilized. It is readily apparent that in such an operation, the reactants are in contact over a wide pressure and temperature range as the heating up and cooling down process is carried out prior to reaching the desired temperature and pressure level, and following the period at the desired temperature and pressure level. In carrying out the process of our invention, the reactants are compressed to our desired superatmospheric pressure level, then contacted and thermally reacted with one another at the pressure which has been previously established. During compression, the reactants are not subjected to any external heating, and their temperature will be substantially that of the atmosphere plus any heat added to them by and during the compression stage. Further, during this compression stage, the heat added to them by compression may be lost by heat exchange with the atmosphere.

Pressure itself is one of the important variables of our process. By obtaining and maintaining the proper pressure, substantially no carbon formation during the reaction is encountered. The condensation reactions with which our invention is concerned, ordinarily proceed with the best yields when conducted at substantially superatmospheric pressure. We have obtained excellent results in the range of 1,000 to 12,000 pounds per square inch. In a continuous process, such as has now been demonstrated by the process of our invention, the desired pressure level can be maintained, by the utilization of suitable pressure controlling instruments and valves. Such pressure controlling instruments may be air driven, electrically driven, etc. In some instances, pressures higher than 12,000 pounds per square inch are not only operable but may be advantageous from the standpoint of increased yields and selectivity of the reaction. Consequently, the foregoing pressure ranges are to be taken as indicative of the general range throughout which our condensation reactions will be obtained.

The temperature at which our process is conducted is dependent to a certain extent upon the reactants employed. For example, when an alkylaromatic hydrocarbon such as toluene, ethylbenzene, or normal propylbenzene is being condensed with an olefinic hydrocarbon such as ethylene or propylene, a reaction temperature of about 400° C. or greater ordinarily is necessary to obtain appreciable yield. However, when the alpha carbon atom of the aromatic compound has attached thereto an active hydrogen atom, the reaction will take place at appreciably lower temperatures. In general, the reaction temperatures employed in our process will be in excess of about 350° C., and as hereinbefore stated, will not exceed 500° C. at which point extensive thermal decomposition ensues. The temperature and the hourly liquid space velocity utilized are inversely proportional to a certain extent. Hourly liquid space velocities from about 0.1 to about 10 are generally preferred, although higher or lower space velocities may be utilized. At a specific temperature, a decrease in the space velocity will cause an increase in yields. Conversely, at a specific temperature, an increase in space velocity will cause a decrease in yields.

Additional details and advantages of our invention will be apparent from the following examples which are given for the purposes of illustration and not for purposes of limitation. The continuous type experiments listed in the examples were carried out in a high pressure laboratory flow apparatus similar to that described in Industrial and Engineering Chemistry, volume 40, starting on page 2059. In some of the experiments, the reactor section was packed with copper punchings or other material, whereas in other experiments, the reaction zone was empty. Also, a copper liner was used in the reactor in some of the experiments whereas an unlined stainless steel reactor was used in other of the experiments. The thermocouple cover was in some instances covered with copper. Copper is, of course, a noncatalytic substance in this reaction. The principal products recovered in the experiments were identified by means of boiling point, index of refraction, chemical tests, and by comparing the infrared spectrum of the product with samples of known compounds. For the latter purpose, a number of pure compounds for which infrared spectra were unknown, had to be synthesized.

*Example I*

The experiments shown in the following Table I were made to determine the effect of various contacting media upon the reaction of ethylene with toluene. In Run 1, no contacting media was used. In all of the experiments except No. 4, a copper liner was employed. In experiment 4, a stainless steel reactor was used without a lining.

TABLE I

[Toluene+ethylene (3.0:1 mol ratio) in the presence of various contacting media at 450° C., 12,000 p. s. i., ≈2.50 HLSV.]

| Run Number<br>Contacting Agent | 1<br>None | 2<br>$SiO_2$-$Al_2O_3$ | 3<br>Quartz | 4<br>St. Steel | 5<br>$SiO_2$ | 6<br>$Al_2O_3$ | 7<br>Char. | 8<br>Cu |
|---|---|---|---|---|---|---|---|---|
| Aromatic Chgd. | $\phi CH_3$ | $\phi CH_3$ | $\phi CH_3$ | $\phi CH_3$ | $\phi CH_3$ | $\phi CH_3$ | $\phi CH_3$ | $\phi CH_3$ |
| Gms. | 256.1 | 266.0 | 294.6 | 278.9 | 291.6 | 221.9 | 279.3 | 314.0 |
| Mols. | 2.78 | 2.89 | 3.20 | 3.03 | 3.17 | 2.41 | 3.04 | 3.41 |
| Olefin Chgd. | $C_2=$ | $C_2=$ | $C_2=$ | $C_2=$ | $C_2=$ | $C_2=$ | $C_2=$ | $C_2=$ |
| Gms. | 26.0 | 27.0 | 30.4 | 27.9 | 27.8 | 21.8 | 27.0 | 32.1 |
| Mols. | 0.93 | 0.97 | 1.09 | 1.00 | 0.99 | 0.78 | 0.96 | 1.15 |
| Mol Ratio Aromatic to Olefin | 3.0/1 | 3.0/1 | 3.0/1 | 3.0/1 | 3.2/1 | 3.1/1 | 3.2/1 | 3.0/1 |
| Experimental Conditions: | | | | | | | | |
| Furnace Temperature, °C | 462 | 362 | 457 | 456 | 459 | 462 | 461 | 462 |
| Contact Temp., °C | 449 | 352 | 451 | 455 | 450 | 450 | 450 | 451 |
| Pressure, p. s. i. | 11,960 | 12,090 | 11,990 | 12,100 | 12,000 | 11,980 | 12,020 | 12,050 |
| H. L. S. V. | 2.38 | 2.40 | 2.42 | 2.28 | 2.60 | 2.22 | 2.36 | 2.50 |
| Liquid Product, Gms. | 279.5 | 292.4 | 322.7 | 303.9 | 317.0 | 243.7 | 302.5 | 346.0 |
| Olefin Recovered: | | | | | | | | |
| Gms. | 0.5 | 0.5 | 0.9 | 0.5 | 0.3 | 0.3 | 0.1 | 0.8 |
| Percent | 1.9 | 1.9 | 3.0 | 1.8 | 1.1 | 1.4 | 0.4 | 2.4 |
| Aromatic Recovered: | | | | | | | | |
| Gms. | 219.0 | 182.4 | 255.8 | 242.7 | 257.2 | 200.8 | 250.8 | 271.8 |
| Percent | 85.5 | 68.6 | 86.8 | 87 | 88.2 | 90.5 | 89.8 | 86.7 |
| Mols of Olefin Reacted | 0.91 | 0.94 | 1.06 | 0.98 | 0.98 | 0.77 | 0.96 | 1.12 |
| Gms. | 25.5 | 26.5 | 29.5 | 27.4 | 27.5 | 21.5 | 26.9 | 31.9 |
| Mols of Aromatic Reacted | 0.40 | 0.91 | 0.42 | 0.39 | 0.37 | 0.23 | 0.31 | 0.46 |
| Gms. | 37.1 | 83.6 | 38.8 | 36.2 | 34.4 | 21.1 | 28.5 | 42.0 |
| Mols of Aromatic Reacted per Mol of Olefin | 0.44 | 0.97 | 0.40 | 0.40 | 0.38 | 0.30 | 0.32 | 0.41 |
| Composition of product Resulting from: | | | | | | | | |
| 1 M. olef.+1 M. aromatic— | | | | | | | | |
| Gms. | 24.0 | a 82.1 | 27.3 | b 23.9 | c 25.3 | d 20.4 | 23.5 | 36.3 |
| Mols. | 0.20 | 0.68 | 0.23 | 0.20 | 0.21 | 0.17 | 0.20 | 0.30 |
| Mol percent based on total— | | | | | | | | |
| Olefin reacted | 22.0 | 72.4 | 21.7 | 20.0 | 21.5 | 22.1 | 20.8 | 26.7 |
| Aromatic Reacted | 50.0 | 74.7 | 54.7 | 51.3 | 56.8 | 73.9 | 64.5 | 65.3 |
| 2 M. olef.+1 M. aromatic— | | | | | | | | |
| Gms. | 16.0 | 15.1 | 17.5 | 14.5 | 11.2 | 7.2 | 9.7 | 8.3 |
| Mols. | 0.11 | 0.10 | 0.12 | 0.10 | 0.08 | 0.05 | 0.07 | 0.06 |
| Mol percent based on total— | | | | | | | | |
| Olefin reacted | 24.2 | 21.2 | 22.6 | 20.0 | 16.3 | 13.0 | 14.6 | 10.7 |
| Aromatic Reacted | 26.5 | 11.0 | 28.6 | 25.6 | 21.6 | 21.7 | 22.6 | 13.0 |
| Aromatic Conversion, Percent | 14.5 | 31.4 | 13.2 | 13.0 | 11.8 | 9.5 | 10.2 | 13.3 |
| Olefin Conversion, Percent | 98.1 | 98.1 | 97.0 | 98.2 | 98.9 | 98.6 | 99.6 | 97.6 |
| Yield Based on Aromatic Conversion | 76.5 | 85.7 | 83.3 | 76.9 | 78.4 | 95.6 | 87.1 | 78.3 |
| Yield Based on Olefin Conversion | 46.2 | 93.6 | 44.3 | 40.0 | 37.8 | 35.1 | 35.4 | 37.4 | a Predominantly disubstituted benzene compounds (Infrared analysis).
b 8% disubstituted benzene compounds.
c 5% disubstituted benzene compounds.
d 9% disubstituted benzene compounds.

The experiments in which copper pellets were used, in which quartz chips were employed as the packing, and in which stainless steel turnings were used in the stainless steel tube, produced results which were essentially the same as those obtained in Experiment 1 in which no packing was used in a copper lined reaction tube. The presence of copper pellets appears to make the reaction somewhat more selective. These results may be summarized as follows:

Side chain alkylation took place with no nuclear alkylation and over 97% of the ethylene reacted. The yield of $C_9H_{12}$ hydrocarbons produced amounted, on the average, to about 21 mol per cent based on ethylene reacted, and to about 50–65 mol per cent based on the toluene reacted. These hydrocarbons consisted of 80–90% of n-propylbenzene and 4–9% of isopropylbenzene. In each of the experiments, about 20–24 mol per cent hydrocarbons, based on aromatic reacted and corresponding to amylbenzenes, were produced. The total weight per cent yield based on aromatic conversion amounted to about 80%, and the total weight per cent yield based on olefin conversion amounted to about 40%. The contacting media removed from the reaction zone at the end of the experiments were clean and not covered with any carbonaceous material.

Very similar results were obtained with charcoal as the contacting media at 450° C. Of course, the amount of carbon formation when charcoal is used, is indeterminate. Here again, side chain alkylation took place and the composition of the $C_9H_{12}$ hydrocarbons was over 90% n-propylbenzene.

As expected, the silica-alumina catalyst employed in Experiment 2, induced the reaction of ethylene with toluene at 352° C. More than 98% of the ethylene charged reacted. The yield of $C_8H_{10}$ and $C_9H_{12}$ hydrocarbons amounted to 72 mol per cent based on ethylene reacted and 75 mol per cent based on toluene reacted. The main reaction was nuclear alkylation. The principal products consisted of ethyltoluenes, the composition of which was about 17% ortho, 55% meta, and 28% p-ethyltoluene. The $C_8H_{10}$ hydrocarbons were composed of ethylbenzene and xylenes. The formation of xylenes and ethylbenzene is probably due to an alkyl transfer reaction, which probably proceeded through disproportionation of toluene into xylene and benzene, the latter then reacting with ethylene to form ethylbenzene or through the interaction of ethyltoluene with toluene to form ethylbenzenes and xylenes. The recovered toluene fraction also contained benzene. After the reaction, the catalyst was black; it contained 1.6% carbon. Since silica-alumina is a well-known nuclear alkylation catalyst, this experiment shows that when known aromatic alkylation catalysts are employed, under the operating conditions used in our process, the main reaction is nuclear alkylation; side chain alkylation is not obtained. Accordingly, our invention is carried out in the absence of known alkylation catalysts.

Alumina and silica were individually evaluated as contacting media. In the presence of these materials, side chain alkylation was the principal reaction. The $C_9H_{12}$ compounds, amounting to 22 mol per cent based on the ethylene reacted, and 55–75 mol per cent based on the toluene reacted, were composed of about 90% n-propylbenzene, along with isopropylbenzene and a small amount of m-ethyltoluene. The weight per cent yields based upon the toluene reacted range from 78–96%, and the weight per cent yields based upon olefin reacted are about 36%. After reaction, the alumina was light gray; whereas the silica gel was black.

*Example II*

The results obtained when condensing toluene with six different olefins including ethylene, propylene, 1-decene, 1-dodecene, cyclohexene, and methylcyclohexene, are shown in the following Table II.

TABLE II

[Toluene + various olefins (3.0:1) in the presence of copper pellets at 450° C., 12,000 p. s. i., and ≈2.50 HLSV.]

| Run No. | 9 | 10 | 11 | 12 | 13 | 14 |
|---|---|---|---|---|---|---|
| Contacting Agent | Cu | Cu | Cu | Cu | Cu | Cu |
| Aromatic Charged | $\phi CH_3$ | $\phi CH_3$ | $\phi CH_3$ | $\phi CH_3$ | $\phi CH_3$ | $\phi CH_3$ |
| Gms | 314.0 | 425.0 | 291.1 | 111.4 | 303.2 | 293.4 |
| Mols | 3.41 | 4.62 | 3.16 | 1.21 | 3.30 | 3.19 |
| Olefin charged | $C_2=$ | $C_3=$ | $1-C_{10}=$ | $1-C_{12}=$ | cyclo $C_6=$ | Methylcyclo $C_6=$ |
| Gms | 32.1 | 64.8 | 147.8 | 67.8 | 90.3 | 101.6 |
| Mols | 1.15 | 1.54 | 1.06 | 0.40 | 1.10 | 1.06 |
| Mol Ratio Aromatic to Olefin | 3.0/1 | 3.1/1 | 3.0/1 | 3.0/1 | 3.0/1 | 3.0/1 |
| Experimental Conditions: | | | | | | |
| Furnace Temp., °C | 462 | 461 | 462 | 461 | 461 | 470 |
| Contact Temp., °C | 451 | 451 | 451 | 450 | 440 | 450 |
| Pressure, p. s. i | 12,050 | 12,060 | 11,990 | 12,000 | 12,020 | 11,840 |
| H. L. S. V. | 2.50 | 2.44 | 2.40 | 2.22 | 2.42 | 2.42 |
| Liquid Product, Gms | 346.0 | 485.5 | 429.9 | 178.0 | 413.9 | 407.1 |
| Olefin Recovered: | | | | | | |
| Gms | 0.8 | 1.9 | 16.5 | 19.4 | 75.6 | 84.6 |
| Percent | 2.4 | 2.9 | 11.1 | 28.6 | 83.6 | 83.3 |
| Aromatic Recovered: | | | | | | |
| Gms | 271.8 | 374.3 | 259.7 | 99.1 | 294.8 | 282.3 |
| Percent | 86.7 | 86.7 | 89.3 | 89.0 | 97.2 | 96.2 |
| Mols of olefin reacted | 1.12 | 1.51 | 0.94 | 0.29 | 0.18 | 0.18 |
| Gms | 31.9 | 63.0 | 131.3 | 48.4 | 14.7 | 17.0 |
| Mols of aromatic reacted | 0.46 | 0.56 | 0.34 | 0.13 | 0.10 | 0.12 |
| Gms | 42.0 | 51.0 | 31.4 | 12.3 | 8.4 | 11.1 |
| Mols of aromatic reacted per mol of olefin | 0.41 | 0.37 | 0.36 | 0.47 | 0.56 | 0.67 |
| Composition Of Product Resulting from: | | | | | | |
| 1 M. olef. + 1 M. aromatic— | | | | | | |
| Gms | 36.3 | 48.6 | 72.0 | 11.7 | (*)16.7 | 22.4 |
| Mols | 0.30 | 0.36 | 0.31 | 0.05 | 0.096 | 0.12 |
| Mol Percent Based on total— | | | | | | |
| Olefin Reacted | 26.7 | 24.0 | 33.0 | 17.2 | 53.3 | 66.7 |
| Aromatic Reacted | 65.3 | 64.3 | 91.2 | 38.5 | 96.0 | 100 |
| 2 M. olef.+1 M. aromatic— | | | | | | |
| Gms | 8.3 | 17.6 | | 20.5 | | |
| Mols | 0.06 | 0.10 | | 0.05 | | |
| Mol. Percent Based on Total— | | | | | | |
| Olefin Reacted | 10.7 | 13.2 | | 34.4 | | |
| Aromatic Reacted | 13.0 | 17.9 | | 38.5 | | |
| Aromatic Conversion, Percent | 13.3 | 13.3 | 10.7 | 11.0 | 2.8 | 3.8 |
| Olefin Conversion, Percent | 97.6 | 97.1 | 88.9 | 71.4 | 16.4 | 16.7 |
| Yield based on Aromatic Conversion | 78.3 | 82.2 | 91.2 | 77.0 | 96.0 | 100 |
| Yield based on Olefin Conversion | 37.4 | 37.2 | 33.0 | 51.6 | 53.3 | 66.7 |

(*)May contain some dicyclic hydrocarbons.

The product resulting from the condensation of one molecule of ethylene with one molecule of toluene consisted of 90–95% of n-propylbenzene and 5–10% of isopropylbenzene. The product resulting from the condensation of two mols of ethylene with one mol of toluene consisted primarily of n-pentylbenzene. The weight per cent yield based on toluene conversion was 78.3%, and on ethylene conversion was 37.4%.

The product resulting from the condensation of one molecule of propylene with one molecule of toluene consisted of approximately 90% n-butylbenzene and 10% isobutylbenzene. The weight per cent yield based on toluene conversion was 82.2%, and on propylene conversion was 37.2%.

reaction. Of the olefins reacted, over 50% condensed with toluene to form phenylcyclohexylmethane and phenylmethylcyclohexylmethane respectively. In both cases utilizing cycloolefins, the weight per cent yield based on the aromatic conversion was high, 96–100% and the weight per cent based on olefin conversion ranged from 53–67%.

*Example III*

The effect of operating variables upon the side chain alkylation of toluene with ethylene was investigated. The pressure range covered in this investigation was 3000–12000 p. s. i.; the temperature range was 375–450° C.; and the liquid hourly space velocity range was 0.7–2.5. The results obtained are given in Table III.

TABLE III

[Toluene+ethylene (3.0:1) in the presence of copper at 375°–450° C., 3000–12000 p. s. i., and 0.66–2.50 HLSV.]

| Run No. | 15 | 16 | 17 | 18 | 19 | 20 |
|---|---|---|---|---|---|---|
| Contacting Agent | Cu | Cu | Cu | Cu | Cu | Cu |
| Aromatic charged | | | | | | |
| Gms | $\phi CH_3$ | $\phi CH_3$ | $\phi CH_3$ | $\phi CH_3$ | $\phi CH_3$ | $\phi CH_3$ |
| Mols | 314.0 | 252.3 | 257.2 | 314.8 | 304.0 | 228.8 |
| | 3.41 | 2.74 | 2.80 | 3.42 | 3.30 | 2.49 |
| Olefin charged | | | | | | |
| Gms | $C_2=$ | $C_2=$ | $C_2=$ | $C_2=$ | $C_2=$ | $C_2=$ |
| Mols | 32.1 | 24.6 | 26.9 | 31.1 | 29.6 | 23.6 |
| | 1.15 | 0.88 | 0.96 | 1.11 | 1.06 | 0.84 |
| Mol Ratio Aromatic to Olefin | 3.0/1 | 3.1/1 | 2.9/1 | 3.1/1 | 3.1/1 | 3.0/1 |
| Experimental Conditions: | | | | | | |
| Furnace Temp., °C | 462 | 410 | 386 | 460 | 412 | 412 |
| Contact Temp., °C | 451 | 401 | 376 | 450 | 400 | 400 |
| Pressure, p. s. i. | 12,050 | 11,980 | 12,000 | 3,100 | 3,100 | 3,100 |
| H. L. S. V. | 2.50 | 2.34 | 2.46 | 2.44 | 2.46 | 0.66 |
| Liquid Product, Gms | 346.0 | 271.6 | 269.4 | 341.5 | 315.0 | 246.7 |
| Olefin Recovered: | | | | | | |
| Gms | 0.8 | 5.0 | 14.7 | 3.6 | 17.4 | 6.0 |
| Percent | 2.4 | 20.3 | 54.6 | 11.6 | 58.8 | 25.4 |
| Aromatic Recovered: | | | | | | |
| Gms | 271.8 | 228.0 | 244.6 | 278.9 | 289.5 | 209.2 |
| Percent | 86.7 | 90.4 | 95.1 | 88.6 | 95.2 | 91.4 |
| Mols of Olefin Reacted | 1.12 | 0.70 | 0.44 | 0.98 | 0.44 | .63 |
| Gms | 31.9 | 19.6 | 12.2 | 27.5 | 12.2 | 17.6 |
| Mols of Aromatic Reacted | 0.46 | 0.26 | 0.14 | 0.39 | 0.16 | 0.21 |
| Gms | 42.0 | 24.3 | 12.6 | 35.9 | 14.5 | 19.6 |
| Mols of Aromatic Reacted per Mol of Olefin | 0.41 | 0.37 | 0.33 | 0.40 | 0.36 | 0.33 |
| Composition of Product Resulting from: | | | | | | |
| 1 M. Olef.+1 M. aromatic— | | | | | | |
| Gms | 36.3 | 12.0 | 3.9 | 27.0 | 3.6 | 11.6 |
| Mols | 0.30 | 0.10 | 0.03 | 0.23 | 0.03 | .10 |
| Mol percent based on total— | | | | | | |
| Olefin Reacted | 26.7 | 14.3 | 6.8 | 23.5 | 6.8 | 15.9 |
| Aromatic Reacted | 65.3 | 38.5 | 21.4 | 57.5 | 18.7 | 48.6 |
| 2 M. olef.=1 M. aromatic— | | | | | | |
| Gms | 8.3 | 8.9 | 3.1 | 12.6 | 2.0 | 9.2 |
| Mols | 0.06 | 0.06 | 0.02 | 0.09 | 0.01 | .06 |
| Mol percent based on total— | | | | | | |
| Olefin Reacted | 10.7 | 17.2 | 9.1 | 18.4 | 4.5 | 19.0 |
| Aromatic Reacted | 13.0 | 23.1 | 14.3 | 22.5 | 6.3 | 28.6 |
| Aromatic Conversion, percent | 13.3 | 9.6 | 4.9 | 11.4 | 4.8 | 8.6 |
| Olefin Conversion, percent | 97.6 | 79.7 | 45.4 | 88.4 | 41.2 | 74.6 |
| Yield based on Aromatic Conversion | 78.3 | 61.1 | 35.7 | 80.0 | 25.0 | 77.2 |
| Yield based on Olefin Conversion | 37.4 | 31.5 | 15.9 | 41.9 | 11.3 | 34.9 |

The principal products formed in experiments 11 and 12 in which the olefins were 1-decene and 1-dodecene respectively were undecyl-, and tridecylbenzene. The reaction is somewhat more complicated than the reaction in which a lower boiling olefin was utilized. This is shown by the fact that some lower boiling alkylbenzenes are formed. High molecular weight alkylbenzenes also are formed. A portion of the tridecylbenzene was sulfonated, neutralized with sodium hydroxide, and evaluated as a detergent. It was found that the detergency of the resulting sulfonate was greatly superior to the standard, Nacconol NR. It is believed that detergents of this type are new compositions of matter, inasmuch as the alkyl group contains no branching whatsoever. Thus, it can be seen that one of the principal advantages of our process is that it affords a direct method for producing alkylbenzenes in which the alkyl group is a straight chain, said compound being convertible into superior surface active agents.

The reaction of alkylaromatic hydrocarbons such as toluene with cycloolefins appears to be somewhat more difficult than the reaction with aliphatic olefins. For example, in experiment 13, 83.6% of the cyclohexene was recovered. Of the 16.4% of the cyclohexane that reacted, only about 50% underwent the desired types of These data indicate that as the reaction temperature is lowered at a given pressure and space velocity, the extent of both aromatic conversion and olefin conversion decreases. A deleterious effect of this lower conversion can also be noted on the yields based upon the conversions. Lowering the pressure from 12000 p. s. i. to 3000 p. s. i. while maintaining a constant temperature and space velocity, has very little effect upon conversion and yields. At 3000 p. s. i., a decrease in temperature at a constant space velocity results in lower conversions and yields. This drop in conversion and yield can be overcome by a decrease in space velocity as demonstrated in Experiment 20 wherein the space velocity was cut about 3.5 times and this just about compensated for a 50° C. decrease in reaction temperature.

*Example IV*

The effect of charcoal packing was studied at temperatures of 351° C., 399° C., and 450° C. This study was carried out at 12000 p. s. i. and at an hourly liquid space velocity of about 2.35. The results are summarized in Table IV.

TABLE IV

[Toluene + ethylene (3.0:1) in the presence of charcoal at 350–450° C., 12,000 p. s. i. and 2.50 HLSV.]

| Run No. | 21 | 22 | 23 |
|---|---|---|---|
| Contacting Agent | Charcoal | Charcoal | Charcoal |
| Aromatic Charged | Toluene | Toluene | Toluene |
| Grams | 279.3 | 294.4 | 282.2 |
| Mols | 3.04 | 3.20 | 3.07 |
| Olefin Charged | $C_2=$ | $C_2=$ | $C_2=$ |
| Grams | 27.0 | 28.9 | 27.8 |
| Mols | 0.96 | 1.03 | 0.99 |
| Mol Ratio Aromatic to Olefin | 3.2/1 | 3.1/1 | 3.1/1 |
| Experimental Conditions: | | | |
| Furnace Temp., °C | 461 | 407 | 364 |
| Contact Temp., °C | 450 | 399 | 351 |
| Pressure, p. s. i. | 12,020 | 11,980 | 11,970 |
| H. L. S. V. | 2.36 | 2.36 | 2.30 |
| Liquid Product, Gms | 302.5 | 318.3 | 291.3 |
| Olefin Recovered: | | | |
| Gms | 0.1 | 1.8 | 17.5 |
| Percent | 0.4 | 6.2 | 63.0 |
| Aromatic Recovered: | | | |
| Gms | 250.8 | 276.1 | 280.3 |
| Percent | 89.8 | 93.8 | 99.3 |
| Mols of Olefin Reacted | 0.96 | 0.97 | 0.37 |
| Gms | 26.9 | 27.1 | 10.3 |
| Mols of Aromatic Reacted | 0.31 | 0.20 | 0.02 |
| Gms | 28.5 | 18.3 | 1.9 |
| Mols of Aromatic Reacted per Mol of Olefin | 0.32 | 0.21 | 0.05 |
| Composition of Product Resulting from: | | | |
| 1 M. olef. + 1 M. Aromatic— | | | |
| Gms | 23.5 | *16.0 | 1.0 |
| Mols | 0.20 | 0.13 | 0.01 |
| Mol % Based on total— | | | |
| Olefin reacted | 20.8 | 13.4 | 3.0 |
| Aromatic Reacted | 64.5 | 65.0 | 50.0 |
| 2 M. olef. + 1 M. Aromatic— | | | |
| Gms | 9.7 | 3.3 | 1.7 |
| Mols | 0.07 | 0.02 | 0.01 |
| Mol Percent Based on total— | | | |
| Olefin Reacted | 14.6 | 4.1 | 6.0 |
| Aromatic Reacted | 22.6 | 10.0 | 50.0 |
| Aromatic Conversion, Percent | 10.2 | 6.2 | 0.7 |
| Olefin Conversion, Percent | 99.6 | 93.8 | 37.0 |
| Yield based on Aromatic Conversion | 87.1 | 75.0 | 100 |
| Yield based on Olefin Conversion | 35.4 | 17.5 | 9.0 |

* 14% disubstituted benzene compounds.

At 351° C., only 37% of the ethylene reacted yielding mostly polymeric hydrocarbons. Less than 1% of the aromatic hydrocarbon charged, reacted. At higher temperatures, the conversion of ethylene was essentially complete. The yield of $C_9H_{12}$ hydrocarbons based on ethylene reacted increased with the reaction temperature, amounting to 3%, 13%, and 21%, at 351°, 399°, and 450° C., respectively. The yield of $C_9H_{12}$ hydrocarbons based on toluene reacted ranged from 50 to about 65%, the yield increasing with increasing reaction temperature. The $C_9H_{12}$ hydrocarbons formed at 399° C. consisted of 75% n-propylbenzene and 14% ethyltoluene. At 450° C. the composition was 90% n-propylbenzene, 4% isopropylbenzene, and the remainder, ethyltoluenes. The weight per cent yields based on aromatic conversion ranged from 75 to about 87%. The figure of 100% for the 351° C. experiment may be questioned somewhat since the actual yields of products were so small. The weight per cent yield based upon olefin conversion decreased from 35.4% at 450° C. to 9.0% at 351° C.

Example V

The effect of varying the mol ratio of aromatic to olefin upon the side chain alkylation of toluene with propylene was investigated. These experiments were all carried out at approximately 450° C. and at an hourly liquid space velocity of approximately 2.3. Two experiments were carried out at 12,000 p. s. i. and another two at 6,000 p. s. i. The data obtained are summarized in Table V.

TABLE V

[Toluene+propylene in the presence of copper at 450° C, 6,000–12,000 p. s. i., and 2.5 HLSV (and various mol ratios)]

| Run No. | 24 | 25 | 26 | 27 |
|---|---|---|---|---|
| Contacting Agent | Cu | Cu | Cu | Cu |
| Aromatic Charged | Toluene | Toluene | Toluene | Toluene |
| Gms | 425.0 | 1001.0 | 1023.7 | 1057.6 |
| Mols | 4.62 | 10.88 | 11.13 | 11.50 |
| Olefin Charged | $C_3=$ | $C_3=$ | $C_3=$ | $C_3=$ |
| Gms | 64.8 | 47.2 | 45.7 | 24.2 |
| Mols | 1.54 | 1.12 | 1.11 | 0.58 |
| Mol Ratio Aromatic to Olefin | 3.1/1 | 9.7/1 | 10.0/1 | 19.8/1 |
| Experimental Conditions: | | | | |
| Furnace Temp., °C | 461 | 463 | 454 | 455 |
| Contact Temp., °C | 451 | 451 | 448 | 449 |
| Pressure, p. s. i. | 12,060 | 12,050 | 5,970 | 6,000 |
| H. L. S. V. | 2.44 | 2.32 | 2.32 | 2.32 |
| Liquid Product, Gms | 485.5 | 1046.1 | 1067.5 | 1079.6 |
| Olefin Recovered: | | | | |
| Gms | 1.9 | 4.8 | 5.7 | 7.1 |
| Percent | 2.9 | 10.2 | 12.4 | 29.3 |
| Aromatic Recovered: | | | | |
| Gms | 374.3 | 941.0 | 944.0 | 1025.0 |
| Percent | 86.7 | 94.1 | 92.2 | 97.0 |
| Mols of Olefin Reacted | 1.51 | 1.01 | 0.97 | 0.41 |
| Gms | 63.0 | 42.3 | 40.9 | 17.1 |
| Mols of Aromatic Reacted | 0.56 | 0.64 | 0.87 | 0.35 |
| Gms | 51.0 | 59.0 | 79.6 | 32.2 |
| Mols of Aromatic Reacted per Mol of Olefin | 0.37 | 0.63 | 0.9 | 0.85 |
| Composition of Product Resulting from: | | | | |
| 1 M. olef.+1 M. Aromatic— | | | | |
| Gms | 48.6 | 51.6 | 56.1 | 30.4 |
| Mols | 0.36 | 0.38 | 0.42 | 0.227 |
| Mol Percent Based on total— | | | | |
| Olefin reacted | 24.0 | 38.1 | 43.2 | 55.4 |
| Aromatic Reacted | 64.3 | 60.2 | 48.2 | 65.0 |
| 2 M. olef.+1 M. Aromatic— | | | | |
| Gms | 17.6 | 2.1 | None | 2.8 |
| Mols | 0.10 | 0.12 | None | 0.016 |
| Mol Percent based on total— | | | | |
| Olefin reacted | 13.2 | 1.2 | ---- | 7.8 |
| Aromatic Reacted | 17.9 | 1.9 | ---- | 4.6 |
| Aromatic Conversion, Percent | 13.3 | 5.9 | 7.8 | 3.0 |
| Olefin Conversion, Percent | 97.1 | 89.8 | 87.6 | 70.7 |
| Yield based on Aromatic Conversion | 82.2 | 62.1 | 48.2 | 69.6 |
| Yield based on Olefin Conversion | 37.2 | 39.3 | 43.2 | 63.2 |

Experiments 24 and 25 were carried out at 12000 p. s. i. and at a mol ratio of toluene to propylene of 3.1/1 in one case and 9.7/1 in another. Aromatic conversion was decreased by increasing the mol ratio. The same observation can be made for olefin conversion. The weight per cent yields based on aromatic conversion decreased with increasing mol ratio.

At a constant higher mol ratio of approximately 10.0/1 the effect of lowering the pressure from 12000 to 6000 p. s. i. was noted by comparing experiments 25 and 26. The conversions and yields were not affected materially by this drop in pressure.

At 6000 p. s. i., a further increase in mol ratio was made from 10:1 to about 20:1. This further increase in mol ratio again decreased both aromatic and olefin conversion, but here some beneficial effect on the yield of desired products seems to be obtained.

*Example VI*

The effect of operating variables upon the side chain alkylation of toluene with 1-dodecene was investigated. The pressure in this investigation was held constant at 12000 p. s. i., the hourly liquid space velocity was held constant at 2.4, the temperature was varied in the range of 425–450° C., and the mol ratio of aromatic to olefin was varied from 3.0/1 to 10.1/1. A summary of the results observed is given in Table VI.

At 450° C., 12000 p. s. i., 2.4 HLSV, and with an aromatic to olefin mol ratio of 3.0, the aromatic conversion was 10.7%, and the olefin conversion was 88.9%. The weight per cent yield of desired 1/1 condensation product was 91.2% based on the aromatic reacted, and 33.0% based on the olefin reacted. When the temperature was decreased 25° C. to 425° C., and the aromatic to olefin mol ratio raised to 10.1/1, a decrease in aromatic con-

TABLE VI

[Toluene+1-decene at various mol ratios 425–450° C, 12,000 p. s. i., ≈2.50 HLSV, and in the presence of copper pellets]

| Run Number | 28 | 29 |
|---|---|---|
| Contacting Agent | Cu | Cu |
| Aromatic Charged | Toluene | Toluene |
| Gms | 291.1 | 1158.3 |
| Mols | 3.16 | 12.59 |
| Olefin Charged | 1-C$_{10}$= | 1-C$_{10}$= |
| Gms | 147.8 | 176.3 |
| Mols | 1.06 | 1.26 |
| Mol Ratio Aromatic to Olefin | 3.0/1 | 10.1/1 |
| Experimental Conditions: | | |
| Furnace Temp., °C | 462 | 440 |
| Contact Temp., °C | 451 | 426 |
| Pressure, p. s. i | 11,990 | 12,000 |
| H. L. S. V | 2.40 | 2.44 |
| Liquid Product, Gms | 429.9 | 1333.3 |
| Olefin Recovered: | | |
| Gms | 16.5 | 59.0 |
| Percent | 11.1 | 33.5 |
| Aromatic Recovered: | | |
| Gms | 259.7 | 1054.8 |
| Percent | 89.3 | 91.1 |
| Mols of Olefin Reacted | 0.94 | 0.84 |
| Gms | 131.3 | 117.3 |
| Mols of Aromatic Reacted | 0.34 | 1.125 |
| Gms | 31.4 | 103.5 |
| Mols of Aromatic Reacted per Mol of Olefin | 0.36 | 1.35 |
| Composition of Product Resulting from: | | |
| 1 M. olef.+1 M. aromatic— | | |
| Gms | 72.0 | 86.1 |
| Mols | 0.31 | 0.371 |
| Mol percent based on total— | | |
| Olefin reacted | 33.0 | 44.3 |
| Aromatic reacted | 91.2 | 33.0 |
| 2 M. olef.+1 M. aromatic— | | |
| Gms | | |
| Mols | | |
| Mol percent based on total— | | |
| Olefin reacted | | |
| Aromatic reacted | | |
| Aromatic Conversion, percent | 10.7 | 8.9 |
| Olefin Conversion, percent | 88.9 | 66.5 |
| Yield based on Aromatic Conversion | 91.2 | 33.0 |
| Yield based on Olefin Conversion | 33.0 | 44.3 |

TABLE VII

[Toluene+1-dodecene (3.0:1.0 mol ratio), 400–475° C., 3000–12000 P. s. i., 0.5–2.5 HLSV, and in the presence of copper pellets.]

| Run No | 30 | 31 | 32 | 33 | 34 | 35 | 36 | 37 | 38 | 39 | 40 |
|---|---|---|---|---|---|---|---|---|---|---|---|
| Contacting Agent | Cu | St. Steel | Cu | Cu | Cu | Cu | Cu | Cu | Cu | Cu | St. Steel |
| Aromatic Charged | Toluene | Toluene | Toluene | Toluene | Toluene | Toluene | Toluene | Toluene | Toluene | Toluene | Toluene |
| Gms | 111.4 | 206.1 | 173.1 | 198.5 | 240.8 | 215.4 | 232.2 | 207.2 | 166.3 | 117.9 | 174.2 |
| Mols | 1.21 | 2.24 | 1.88 | 2.16 | 2.62 | 2.34 | 2.52 | 2.26 | 1.81 | 1.28 | 1.89 |
| Olefin charged | 1-C$_{12}$= | 1-C$_{12}$= | 1-C$_{12}$= | 1-C$_{12}$= | 1-C$_{12}$= | 1-C$_{12}$= | 1-C$_{12}$= | 1-C$_{12}$= | 1-C$_{12}$= | 1-C$_{12}$= | 1-C$_{12}$= |
| Gms | 67.8 | 125.5 | 105.3 | 120.5 | 146.5 | 131.0 | 141.4 | 126.1 | 101.2 | 71.7 | 106.1 |
| Mols | 0.40 | 0.75 | 0.63 | 0.72 | 0.87 | 0.78 | 0.84 | 0.75 | 0.60 | 0.45 | 0.63 |
| Mol Ratio Aromatic to Olefin | 3.0/1 | 3.0/1 | 3.0/1 | 3.0/1 | 3.0/1 | 3.0/1 | 3.0/1 | 3.0/1 | 3.0/1 | 3.0/1 | 3.0/1 |
| Experimental Conditions: | | | | | | | | | | | |
| Furnace Temp., °C | 461 | 461 | 433 | 411 | 460 | 492 | 462 | 461 | 460 | 465 | 460 |
| Contact Temp., °C | 450 | 456 | 425 | 401 | 453 | 479 | 451 | 450 | 450 | 451 | 000 |
| Pressure, p. s. i | 12,000 | 12,000 | 12,000 | 12,000 | 6,130 | 3,000 | 3,000 | 3,070 | 3,000 | 3,070 | 0,000 |
| H. L. S. V | 2.22 | 2.76 | 2.34 | 2.52 | 2.40 | 2.40 | 2.26 | 1.34 | 0.65 | 0.52 | 0.50 |
| Liquid Product, Gms | 178.0 | 336.0 | 291.1 | 325.0 | 391.0 | 340.4 | 372.5 | 332.0 | 263.8 | 192.3 | 280.8 |
| Olefin Recovered: | | | | | | | | | | | |
| Gms | 19.4 | 6.8 | 17.0 | 61.4 | 13.1 | 10.5 | 24.2 | 21.1 | 11.7 | 10.1 | 14.3 |
| Percent | 28.6 | 5.4 | 16.1 | 51.0 | 8.9 | 8.0 | 17.1 | 16.7 | 11.6 | 14.1 | 13.5 |
| Aromatic Recovered: | | | | | | | | | | | |
| Gms | 99.1 | 175.4 | 158.7 | 190.9 | 209.6 | 188.7 | 212.3 | 180.4 | 144.2 | 102.1 | 151.0 |
| Percent | 89.0 | 85.1 | 91.7 | 96.2 | 87.0 | 97.6 | 91.4 | 87.1 | 86.7 | 86.6 | 86.7 |
| Mols of Olefin Reacted | 0.29 | 0.707 | 0.526 | 0.352 | 0.794 | 0.717 | 0.70 | 0.496 | 0.533 | 0.367 | 0.546 |
| Gms | 48.4 | 118.7 | 88.3 | 59.1 | 133.4 | 120.5 | 117.2 | 105.0 | 89.5 | 61.6 | 91.8 |
| Mols of Aromatic Reacted | 0.13 | 0.334 | 0.157 | 0.083 | 0.339 | 0.29 | 0.216 | 0.14 | 0.24 | 0.172 | 0.252 |
| Gms | 12.3 | 30.7 | 14.4 | 7.6 | 31.2 | 26.7 | 19.9 | 26.8 | 22.1 | 15.8 | 23.2 |
| Mols of Aromatic Reacted per Mol of Olefin | 0.47 | 0.47 | 0.30 | 0.24 | 0.43 | 0.40 | 0.31 | 0.28 | 0.45 | 0.47 | 0.46 |
| Composition of Product Resulting from: | | | | | | | | | | | |
| 1 M. olef.+1 M. Aromatic— | | | | | | | | | | | |
| Gms | 11.7 | 23.8 | *27.6 | *13.6 | 31.1 | *27.5 | b30.9 | 34.2 | 24.9 | 17.1 | 19.3 |
| Mols | 0.05 | 0.092 | 0.106 | 0.052 | 0.12 | 0.016 | 0.119 | 0.132 | 0.096 | 0.066 | 0.074 |
| Mol percent based on total— | | | | | | | | | | | |
| Olefin reacted | 17.2 | 13.0 | 25.4 | 14.9 | 15.1 | 14.8 | 17.0 | 26.6 | 18.0 | 17.9 | 13.6 |
| Aromatic reacted | 38.5 | 27.5 | 67.5 | 62.7 | 35.4 | 36.6 | 55.0 | 94.3 | 40.0 | 38.8 | 29.3 |
| 2 M. olef.+1 M. aromatic— | | | | | | | | | | | |
| Gms | 20.5 | | | | | | | | | | |
| Mols | 0.05 | | | | | | | | | | |
| Mol per cent based on total— | | | | | | | | | | | |
| Olefin reacted | 34.4 | | | | | | | | | | |
| Aromatic reacted | 38.5 | | | | | | | | | | |
| Aromatic Conversion, percent | 11.0 | 14.9 | 8.3 | 3.8 | 13.0 | 2.4 | 8.6 | 12.9 | 13.3 | 13.4 | 13.3 |
| Olefin Conversion, percent | 71.4 | 94.6 | 83.9 | 49.0 | 91.1 | 92.0 | 82.9 | 83.3 | 88.4 | 85.9 | 86.5 |
| Yield based on Aromatic Conversion | 77.0 | 27.5 | 67.5 | 62.7 | 35.4 | 36.6 | 55.0 | 94.3 | 40.0 | 38.8 | 29.3 |
| Yield based on Olefin Conversion | 51.6 | 13.0 | 25.4 | 14.9 | 15.1 | 14.8 | 17.0 | 26.6 | 18.0 | 17.9 | 13.6 | a Contains some olefinic compound; probably unsaturated alkylate.    b 3.8 g. olefinic; probably unsaturated alkylate.

version and in olefin conversion was experienced. The weight per cent yield product based on aromatic conversion also decreased. From these results it appears that a decrease in yield as is caused by a decrease in temperature cannot be satisfactorily overcome by raising the mol ratio of aromatic to olefin utilized.

*Example VII*

The effect of operating variables on the side chain alkylation of toluene with 1-dodecene at an aromatic to olefin mol ratio of 3.0/1 was investigated. The pressure range covered in this investigation was 3000–12000 p. s. i.; the temperature range was 400°–475° C., and the liquid hourly space velocity range was 0.50–2.75. A summary of the data obtained is given in Table VII.

Experiments 30 and 31 are the same, carried out at 12,000 p. s. i., 450° C., and approximately 2.5 HLSV, except that in Experiment 30 the reactor was lined with copper and filled with copper pellets, whereas in Experiment 31 an unlined stainless steel reactor filled with stainless turnings was used. It will be noted that based upon the weight per cent yields, the conversion in the presence of copper seem to be much more clear cut than those which take place in the presence of stainless steel.

Experiments 32 and 33 are carried out similarly except for a decrease in reaction temperature from 450° C. to 400° C. in the latter one. It will be noted that the aromatic conversions drop off as the temperature is lowered and that the yields based on aromatic conversion and on olefin conversion are lowered as the temperatures are lowered.

Experiments 30, 34, and 36, show the effect of decreasing pressure with these reactants. Olefin conversion remains high throughout while at 3000 pounds, there appears to be some decrease in aromatic conversion. The yields of desired products appear to be more selective at the higher pressure condition in this case.

Experiments 35 and 36 show the effect of increased temperature in which the aromatic conversion is decreased. Raising the temperature of the reaction under these conditions from 450° C. to 475° C., appears to make the reaction less selective.

Experiments 36, 37, 38, 39, and 40 illustrate the effect of lowering the liquid hourly space velocity while holding other conditions constant. Olefin conversion remains about constant throughout, but higher aromatic conversions are obtained at lower hourly liquid space velocities. The weight per cent yields based on aromatic conversion and on olefin conversion appear to be very similar over the entire liquid hourly space velocity range.

*Example VIII*

The effect of operating variables upon the side chain alkylation of toluene with 1-dodecene at an aromatic to olefin mol ratio of 10.0/1 was investigated. The pressure range covered in this investigation was 3000–12,000 p. s. i.; the temperature range was 425°–475° C.; and the liquid hourly space velocity range was 0.4–2.4. A summary of the data obtained are presented in Table VIII.

TABLE VIII

[Toluene + 1-dodecene (10.0:1.0 mol ratio), 425–475° C., 3,000–12,000 p. s. i., 0.5–2.5 HLSV, and in the presence of copper pellets.]

| Run No. | 41 | 42 | 43 | 44 | 45 | 46 | 47 | 48 | 49 | 50 | 51 |
|---|---|---|---|---|---|---|---|---|---|---|---|
| Contacting Agent | Cu | Cu | Cu | Cu | Cu | Cu | Cu | Cu | Cu | Cu | Cu Powder |
| Aromatic Charged | Toluene | Toluene | Toluene | Toluene | Toluene | Toluene | Toluene | Toluene | Toluene | Toluene | Toluene |
| Gms | 1010.4 | 844.2 | 840.9 | 808.8 | 830.1 | 822.4 | 767.6 | 323.3 | 871.8 | 846.5 | 744.5 |
| Mols | 10.98 | 9.18 | 9.14 | 8.79 | 9.02 | 8.94 | 8.34 | 3.50 | 9.48 | 9.20 | 8.09 |
| Olefin Charged | $1\text{-}C_{12}=$ | $1\text{-}C_{12}=$ | $1\text{-}C_{12}=$ | $1\text{-}C_{12}=$ | $1\text{-}C_{12}=$ | $1\text{-}C_{12}=$ | $1\text{-}C_{12}=$ | $1\text{-}C_{12}=$ | $1\text{-}C_{12}=$ | $1\text{-}C_{12}=$ | $1\text{-}C_{12}=$ |
| Gms | 184.5 | 154.1 | 153.5 | 147.7 | 151.6 | 150.2 | 140.2 | 58.8 | 159.2 | 154.6 | 136.0 |
| Mols | 1.10 | 0.92 | 0.91 | 9.88 | 9.90 | 9.89 | 0.83 | 0.35 | 0.95 | 0.92 | 0.81 |
| Mol Ratio Aromatic to Olefin | 10.0/1 | 10.0/1 | 10.0/1 | 10.0/1 | 10.0/1 | 10.0/1 | 10.0/1 | 10.0/1 | 10.0/1 | 10.0/1 | 10.1/1 |
| Experimental Conditions: | | | | | | | | | | | |
| Furnace Temp., °C | 461 | 440 | 483 | 466 | 460 | 457 | 428 | 432 | 462 | 464 | |
| Contact Temp., °C | 450 | 426 | 474 | 453 | 448 | 451 | 423 | 425 | 454 | 451 | |
| Pressure, p. s. i. | 12,130 | 12,060 | 6,030 | 6,030 | 6,040 | 5,990 | 6,070 | 6,040 | 2,980 | 3,060 | 3,150 |
| H. L. S. V. | 2.40 | 2.40 | 1.73 | 1.78 | 1.70 | 0.91 | 0.88 | 0.36 | 1.24 | 1.20 | 0.59 |
| Liquid Product, Gms | 1211.2 | 1010.4 | 1014.4 | 974.0 | 1003.5 | 996.9 | 921.4 | 383.8 | 1038.7 | 1012.1 | 881.8 |
| Olefin Recovered: | | | | | | | | | | | |
| Gms | 22.4 | 50.6 | 11.5 | 22.3 | 32.3 | 14.4 | 33.7 | 7.7 | 27.1 | 31.0 | 13.6 |
| Percent | 12.1 | 32.8 | 7.1 | 15.1 | 21.3 | 9.6 | 24.0 | 13.1 | 17.0 | 20.1 | 10.0 |
| Aromatic Recovered: | | | | | | | | | | | |
| Gms | 918.7 | 787.6 | 791.2 | 753.1 | 779.3 | 770.4 | 727.8 | 297.5 | 820.9 | 801.4 | 684.7 |
| Percent | 90.9 | 93.3 | 94.1 | 93.1 | 92.5 | 94.8 | 92.0 | 94.2 | 94.7 | 92.0 |
| Mols of Olefin Reacted | 0.965 | 0.616 | 0.845 | 0.746 | 0.71 | 0.808 | 0.634 | 0.304 | 0.786 | 0.736 | 0.729 |
| Gms | 162.1 | 103.5 | 142.0 | 125.4 | 119.3 | 135.8 | 106.5 | 51.1 | 132.1 | 123.6 | 122.4 |
| Mols of Aromatic Reacted | 0.997 | 0.615 | 0.54 | 0.605 | 0.552 | 0.674 | 0.433 | 0.28 | 0.553 | 0.49 | 0.65 |
| Gms | 91.7 | 56.6 | 49.7 | 55.7 | 50.8 | 52.0 | 39.8 | 25.8 | 50.9 | 45.1 | 59.8 |
| Mols of Aromatic Reacted Per Mol of Olefin | 1.03 | 1.00 | 0.64 | 0.81 | 0.78 | 0.83 | 0.68 | 0.92 | 0.70 | 0.67 | 0.89 |
| Composition of Product Resulting from: | | | | | | | | | | | |
| 1 M. olef. + 1 M. aromatic— | | | | | | | | | | | |
| Gms | 86.6 | 57.3 | 34.4 | 58.2 | 58.0 | 57.1 | 58.1 | 27.0 | 43.1 | 54.7 | 34.3 |
| Mols | 0.333 | 0.22 | 0.132 | 0.224 | 0.223 | 0.22 | 0.223 | 0.104 | 0.165 | 0.21 | 0.132 |
| Mol percent based on total— | | | | | | | | | | | |
| Olefin reacted | 34.5 | 35.7 | 15.6 | 30.0 | 31.4 | 27.2 | 35.2 | 34.2 | 21.0 | 28.5 | 18.1 |
| Aromatic reacted | 33.4 | 35.8 | 24.4 | 37.0 | 40.4 | 32.6 | 51.5 | 37.1 | 29.8 | 42.8 | 20.3 |
| 2 M. olef. + 1 M. aromatic— | | | | | | | | | | | |
| Gms | | | | | | | | | | | |
| Mols | | | | | | | | | | | |
| Mol percent based on total— | | | | | | | | | | | |
| Olefin reacted | | | | | | | | | | | |
| Aromatic reacted | | | | | | | | | | | |
| Aromatic Conversion, percent | 9.1 | 6.7 | 5.9 | 6.9 | 6.1 | 7.5 | 5.2 | 8.0 | 5.8 | 5.3 | 8.0 |
| Olefin Conversion, percent | 87.9 | 67.2 | 92.9 | 84.9 | 78.7 | 90.4 | 76.0 | 86.9 | 83.0 | 79.9 | 90.0 |
| Yield based on Aromatic Conversion | 33.4 | 35.8 | 24.4 | 37.0 | 40.4 | 32.6 | 51.5 | 37.1 | 29.8 | 42.8 | 20.3 |
| Yield based on Olefin Conversion | 34.5 | 35.7 | 15.6 | 30.0 | 31.4 | 27.2 | 35.2 | 34.2 | 21.0 | 28.5 | 18.1 |

Experiments 41 and 42 illustrate the decrease in conversions that are obtained at 450° C., 12,000 p. s. i., and 2.4 HLSV when the reaction temperature is lowered 3.0/1, 450° C., 12,000 p. s. i., and an hourly liquid space velocity of 2.5 over copper pellets in a copper lined reactor.

TABLE IX

[Various alkylaromatics+ethylene (≈3.0:1) at 450° C., 12,000 p. s. i., 2.50 HLSV over copper pellets]

| Run No. | 52 | 53 | 54 | 55 | 56 | 57 | 58 | 59 | 60 |
|---|---|---|---|---|---|---|---|---|---|
| Contacting Agent | Cu | Cu | Cu | Cu | Cu | Cu | Cu | Cu | Cu |
| Aromatic Charged | Toluene | Ethylbenzene | Cumene | Sec-$C_4H_9$ Benzene | t-$C_4H_9$ Benzene | Indan | $\beta$-Methyl-Napthalene | Diphenylmethane | Cyclo $C_6$-benzene |
| Gms | 314.0 | 221.0 | 229.0 | 265.4 | 126.7 | 288.8 | 174.5 | 290.1 | 362.0 |
| Mols | 3.41 | 2.09 | 2.49 | 1.98 | 0.95 | 2.45 | 1.23 | 1.73 | 2.26 |
| Olefin Charged | $C_2$= | $C_2$= | $C_2$= | $C_2$= | $C_2$= | $C_2$= | $C_2$= | $C_2$= | $C_2$= |
| Gms | 32.1 | 20.5 | 23.2 | 28.7 | 11.7 | 23.2 | 11.2 | 15.8 | 24.5 |
| Mols | 1.15 | 0.73 | 0.83 | 1.02 | 0.42 | 0.83 | 0.40 | 0.56 | 0.875 |
| Mol Ratio Aromatic to Olefin | 3.0/1 | 29./1 | 3.0/1 | 1.9/1 | 2.3/1 | 3.0/1 | 3.1/1 | 3.1/1 | 2.6/0 |
| Experimental Conditions: | | | | | | | | | |
| Furnace Temp., ° C. | 462 | 462 | 437 | 467 | 462 | 463 | 460 | 464 | |
| Contact Temp., ° C. | 451 | 451 | 425 | 452 | 451 | 452 | 450 | 452 | 451 |
| Pressure, p. s. i. | 12,050 | 12,000 | 12,060 | 12,010 | 12,050 | 12,050 | 11,950 | 11,970 | 12,000 |
| H. L. S. V. | 2.50 | 2.42 | 2.36 | 2.42 | 2.52 | 2.38 | 3.36 | 3.15 | 2.47 |
| Liquid Product, Gms | 346.0 | 240.0 | 319.5 | 311.7 | 137.5 | 317.5 | 203.7 | 304.2 | 381.6 |
| Olefin Recovered: | | | | | | | | | |
| Gms | 0.8 | 0.6 | 2.5 | 0.4 | 5.9 | 1.0 | 1.1 | 0.4 | 0.49 |
| Percent | 2.4 | 2.9 | 10.4 | 1.4 | 50.3 | 4.3 | 9.8 | 2.5 | 2.0 |
| Aromatic Recovered: | | | | | | | | | |
| Gms | 271.8 | 184.0 | 265.5 | 211.6 | 123.1 | 215.2 | 158.8 | 262.1 | 302.0 |
| Percent | 86.7 | 83.3 | 89.8 | 79.8 | 97.2 | 74.5 | 91.0 | 90.3 | 83.4 |
| Mols of Olefin Reacted | 1.12 | 0.71 | 0.74 | 1.01 | 0.21 | 0.79 | 0.361 | 0.55 | 0.857 |
| Gms | 31.9 | 19.9 | 20.7 | 28.3 | 5.8 | 22.2 | 10.1 | 15.4 | 24.0 |
| Mols of Aromatic Reacted | 0.46 | 0.35 | 0.28 | 0.402 | 0.03 | 0.625 | 0.111 | 0.17 | 0.385 |
| Gms | 42.0 | 37.0 | 33.5 | 53.8 | 3.6 | 73.6 | 15.7 | 28.0 | 60.0 |
| Mols of Aromatic Reacted Per Mol of Olefin | 0.41 | 0.49 | 0.38 | 0.40 | 0.13 | 0.81 | 0.31 | 0.31 | 0.44 |
| Composition of Product Resulting from: | | | | | | | | | |
| 1 M. olef.+1 M. aromatic— | | | | | | | | | |
| Gms | 36.3 | 30.3 | 27.9 | 20.2 | 4.8 | 47.6 | 8.0 | 9.5 | 25.9 |
| Mols | 0.30 | 0.23 | 0.19 | 0.125 | 0.03 | 0.325 | 0.047 | 0.048 | 0.138 |
| Mol Percent Based on total— | | | | | | | | | |
| Olefin reacted | 26.7 | 32.4 | 25.7 | 12.4 | 14.3 | 41.2 | 13.1 | 8.7 | 15.9 |
| Aromatic reacted | 65.2 | 65.7 | 67.8 | 31.1 | 100 | 52.0 | 42.4 | 28.2 | 35.9 |
| 2 M. olef. + 1 M. Aromatic— | | | | | | | | | |
| Gms | 8.3 | 9.5 | 6.8 | 9.1 | | 15.2 | | | |
| Mols | 0.06 | 0.06 | 0.04 | 0.048 | | 0.087 | | | |
| Mol Percent based on total— | | | | | | | | | |
| Olefin reacted | 10.7 | 16.9 | 11.8 | 9.5 | | 22.0 | | | |
| Aromatic Reacted | 13.0 | 17.2 | 14.3 | 12.0 | | 13.9 | | | |
| Aromatic Conversion, Percent | 13.3 | 16.7 | 10.2 | 20.2 | 2.8 | 25.5 | 9.0 | 9.7 | 16.6 |
| Olefin Conversion, Percent | 97.6 | 97.1 | 89.6 | 98.6 | 49.7 | 95.7 | 90.2 | 97.5 | 98.0 |
| Yield based on Aromatic Conversion | 78.2 | 82.8 | 82.1 | 43.1 | 100 | 65.9 | 42.4 | 28.2 | 35.9 |
| Yield based on Olefin Conversion | 37.4 | 49.3 | 37.5 | 21.9 | 14.3 | 63.2 | 13.1 | 8.7 | 15.9 |

25° C. The lower temperature does not seem to result in more selective reaction.

Experiments 43 and 44 (Experiment 45 is a check run on Experiment 44) illustrate differences in conversion as the temperature is raised at constant pressure, and space velocity conditions. The further increase in temperature above 450° C. at this pressure, 6000 p. s. i., results in less selective reaction.

Experiments 45 and 46 demonstrate the effect of space velocity on increased conversion at a given temperature and pressure condition. Here at the lower space velocity the selectivity of the reaction seems somewhat less.

Experiments 46 and 47 demonstrate the effect of lowering the temperature 25° while maintaining the pressure at 6000 p. s. i. and the space velocity at 0.9. The decrease in temperature is accompanied by a decrease in aromatic and olefin conversion and an apparent increase in the selectivity of the reaction. In Experiment 48, the space velocity is dropped again and an increase in conversion is experienced over Experiment 47, apparently compensating for the 25° C. temperature decrease over Experiment 46.

Experiments 49, 50, and 51, were carried out at 3000 p. s. i., and approximately 450° C. Experiments 49 and 50 are check runs while in Experiment 51, copper powder was substituted for copper pellets. The use of the copper powder apparently gives somewhat better contacting for the conversion of both aromatic and olefin is increased over Experiments 49 and 50.

*Example IX*

The data listed in the following Table IX show the results obtained when condensing ethylene with various alkyl-aromatic hydrocarbons in accordance with our process at an aromatic to olefin mol ratio of approximately Representative alkylaromatic hydrocarbons included are toluene, ethylbenzene, cumene, sec-butylbenzene, tert-butylbenzene, indan, $\beta$-methylnaphthalene, diphenylmethane, and cyclohexylbenzene. In each instance, the ethylene conversion was over 90% except in Experiment 56 with tert-butlylbenzene where the ethylene conversion was about 50%. The aromatic conversion ranged from 10% to about 25% except in the case of tert-butylbenzene in which the aromatic conversion was low, 2.8%. The weight per cent yields of desired products based upon aromatic conversion are similar to those listed for previous experiments as are the yields based upon olefin conversion.

In Experiment 52, the principal product consisted of 90–95% of n-propylbenzene, and 5–10% isopropylbenzene. The principal product from Experiment 53 is sec-butylbenzene. In Experiment 54, the first product was tert-pentylbenzene. Very little condensation of ethylene with tert-butylbenzene was obtained in Experiment 55. This is attributed to the fact that the alpha carbon atom in the side chain of tert-butylbenzene has no hydrogen atoms attached thereto. For this reason, the aromatic compounds that are preferred for use in our process contain a saturated carbon atom attached to a carbon atom of the aromatic nucleus, said saturated carbon atom having at least one hydrogen atom attached thereto.

Experiments 57, 58, 59, and 60 were made with carbocyclic, aromatic compounds having other cyclic rings attached thereto, namely, indan, $\beta$-methylnaphthalene, diphenylmethane, and cyclohexylbenzene. The principal product from the reaction of indan with etheylene was 1-ethylindan, i. e., the product formed by condensation of the ethylene group with one of the saturated alpha carbon atoms in the indan molecule. The structure of 1-ethylindan was proved by comparison of its infrared absorption spectrum with that of a synthetic sample prepared by reacting 1-indanone with ethyl magnesium bromide to yield 1-hydroxy-1-ethylindan, followed by dehydration in the presence of oxalic acid and hydrogenation under 100 atmospheres hydrogen pressure in the presence of n-pentane at a temperature of 30-50° C. to yield 1-ethylindan. This experiment shows that even when the side chain of the aromatic compound is cyclic, rather than aliphatic, the alkyl group attaches to the saturated alpha carbon atom.

In Experiment 58, β-methylnaphthalene was reacted with ethylene. Again, it was established that the ethylene group attached to the methyl side chain. The principal 1/1 condensation product isolated from the reaction of ethylene with diphenylmethane was 1,1-diphenylpropane. With cyclohexyl benzene and ethylene, the 1/1 condensation product was 1-phenyl-1-ethylcyclohexane.

*Example X*

The results obtained when condensing ethylbenzene with three different olefins including ethylene, propylene, and cyclohexene are shown in Table X. These experiments were carried out at an aromatic to olefin mol ratio of approximately 3.0/1, at temperatures ranging from 450° to 475° C., pressures of 500-12,000 p. s. i., and at an hourly liquid space velocity of approximately 2.50 over copper pellets.

TABLE X

[Ethylbenzene+various olefins (≈3.0:1 mol ratio), 450°–475° C., 500–12,000 p. s. i., ≈2.50 HLSV and in the presence of copper pellets]

| Run No. | 61 | 62 | 63 | 64 | 65 | 66 | 67 |
|---|---|---|---|---|---|---|---|
| Contacting Agent | Cu | Cu | Cu | Cu | Cu | Cu | Cu |
| Aromatic Charged | Ethylbenzene | Ethylbenzene | Ethylbenzene | Ethylbenzene | Ethylbenzene | Ethylbenzene | Ethylbenzene |
| Gms | 221.0 | 407.9 | 321.0 | 377.6 | 258.0 | 364.3 | 354.5 |
| Mols | 2.09 | 3.85 | 3.03 | 3.56 | 2.43 | 3.37 | 3.28 |
| Olefin charged | $C_2=$ | $C_2=$ | $C_2=$ | $C_2=$ | $C_3=$ | cyclo $C_6=$ | cyclo $C_6=$ |
| Gms | 20.5 | 41.5 | 28.3 | 34.9 | 34.0 | 105.4 | 102.6 |
| Mols | 0.73 | 1.48 | 1.01 | 1.25 | 0.81 | 1.29 | 1.25 |
| Mol Ratio Aromatic to Olefin | 2.9/1 | 2.6/1 | 3.0/1 | 2.9/1 | 3.0/1 | 2.6/1 | 2.6/1 |
| Experimental Conditions: | | | | | | | |
| Furnace Temp., °C | 462 | 461 | 463 | 462 | 462 | 461 | 486 |
| Contact Temp., °C | 451 | 451 | 452 | 450 | 451 | 450 | 476 |
| Pressure, p. s. i. | 12,000 | 3,010 | 1,490 | 500 | 3,200 | 12,050 | 12,000 |
| H. L. S. V. | 2.42 | 2.44 | 2.60 | 2.52 | 2.40 | 2.30 | 2.42 |
| Liquid Product, Gms | 240.0 | 444.0 | 337.5 | 384.0 | 283.0 | 472.1 | 456.6 |
| Olefin Recovered: | | | | | | | |
| Gms | 0.6 | 2.2 | 11.0 | 27.9 | 11.1 | 76.8 | 25.5 |
| Percent | 2.9 | 5.3 | 34.8 | 80.0 | 32.7 | 72.9 | 24.9 |
| Aromatic Recovered: | | | | | | | |
| Gms | 184.0 | 354.0 | 305.3 | 371.0 | 234.0 | 349.8 | 336.7 |
| Percent | 83.3 | 86.8 | 85.0 | 98.6 | 90.7 | 96.0 | 95.0 |
| Mols of Olefin Reacted | 0.71 | 1.40 | 0.62 | 0.25 | 0.55 | 0.35 | 0.94 |
| Gms | 19.9 | 39.3 | 17.3 | 7.0 | 22.9 | 28.6 | 77.1 |
| Mols of Aromatic Reacted | 0.35 | 0.51 | 0.15 | 0.06 | 0.23 | 0.13 | 0.17 |
| Gms | 37.0 | 53.9 | 15.7 | 6.6 | 24.0 | 14.5 | 17.8 |
| Mols of Aromatic Reacted per Mol of Olefin | 0.49 | 0.34 | 0.24 | 0.25 | 0.42 | 0.37 | 0.18 |
| Composition of Product Resulting from: | | | | | | | |
| 1 M. olef.+1 M. Aromatic— | | | | | | | |
| Gms | 30.3 | 47.0 | 18.6 | None | 21.0 | 13.5 | 13.2 |
| Mols | 0.23 | 0.35 | 0.14 | | 0.12 | 0.07 | 0.07 |
| Mol Percent Based on Total— | | | | | | | |
| Olefin Reacted | 32.4 | 25.0 | 22.5 | | 21.8 | 20.0 | 7.5 |
| Aromatic Reacted | 65.7 | 68.6 | 93.4 | | 52.2 | 53.8 | 41.2 |
| 2 M. olef.+1 M. Aromatic— | | | | | | | |
| Gms | 9.5 | 17.7 | 1.5 | None | 9.0 | | |
| Mols | 0.06 | 0.11 | 0.01 | | 0.04 | | |
| Mol Percent Based on Total— | | | | | | | |
| Olefin Reacted | 16.9 | 15.6 | 3.2 | | 14.5 | | |
| Aromatic Reacted | 17.2 | 21.6 | 6.7 | | 17.4 | | |
| Aromatic Conversion, Percent | 16.7 | 13.2 | 15.0 | 1.4 | 9.3 | 4.0 | 5.0 |
| Olefin Conversion, Percent | 97.1 | 94.7 | 65.2 | 20.0 | 67.3 | 27.1 | 75.1 |
| Yield based on Aromatic Conversion | 82.9 | 90.2 | 100.1 | 0.0 | 69.6 | 53.8 | 41.2 |
| Yield based on Olefin Conversion | 49.3 | 40.6 | 25.7 | 0.0 | 36.3 | 20.0 | 7.5 |

Experiments 61, 62, 63, and 64 were carried out with ethylene at 450° C., approximately 2.5 HLSV, and with pressure ranging from 500–12,000 p. s. i. The decrease in aromatic and olefin conversions with the decrease in pressure are readily observable. No reaction products were isolated from the experiment at 500 p. s. i.

The results of the reaction of ethylbenzene with propylene are given in Experiment 65. 52.2% of the ethylbenzene that reacted, combined with 21.8% of the propylene that reacted to yield the desired 1/1 molar condensation product.

Experiments 66 and 67 demonstrate the reaction of ethylbenzene with cyclohexane at 12,000 p. s. i., approximately 2.4 HLSV, and with a temperature of 450° C. and 475° C. The higher temperature results in higher aromatic and olefin conversion accompanied by a decrease in the selectivity of the reaction.

*Example XI*

The results obtained by condensing cumene with two different olefins including ethylene, and cyclohexene are shown in Table XI.

TABLE XI

[Cumene + various olefins ≈3.0:1 mol ratio, 375–475° C., 500–12,000 p. s. i., ≈2.50 HLSV, and in the presence of copper pellets.]

| Run No. | 68 | 69 | 70 | 71 | 72 |
|---|---|---|---|---|---|
| Contacting Agent | Cu | Cu | Cu | Cu | Cu |
| Aromatic Charged | Cumene | Cumene | Cumene | Cumene | Cumene |
| Gms | 299.0 | 280.0 | 233.0 | 296.6 | 425.9 |
| Mols | 2.49 | 2.33 | 1.94 | 2.48 | 3.55 |
| Olefin charged | $C_2=$ | $C_2=$ | $C_2=$ | $C_2=$ | cyclo-$C_6=$ |
| Gms | 23.2 | 21.6 | 18.1 | 23.1 | 97.0 |
| Mols | 0.83 | 0.77 | 0.65 | 0.83 | 1.18 |
| Mol Ratio Aromatic to Olefin | 3.0/1 | 3.0/1 | 3.0/1 | 3.0/1 | 3.0/1 |
| Experimental Conditions: | | | | | |
| Furnace Temp., °C | 437 | 487 | 487 | 388 | 462 |
| Contact Temp., °C | 425 | 476 | 476 | 375 | 451 |
| Pressure, p. s. i. | 12,060 | 12,080 | 12,070 | 12,040 | 11,950 |
| H. L. S. V. | 2.36 | 2.48 | 1.30 | 2.28 | 2.46 |
| Liquid Product, Gms | 319.5 | 297.4 | 244.7 | 308.5 | 523.2 |
| Olefin Recovered: | | | | | |
| Gms | 2.5 | 0.2 | 0.3 | 18.1 | 57.0 |
| Percent | 10.4 | 0.9 | 1.4 | 78.4 | 58.8 |
| Aromatic Recovered: | | | | | |
| Gms | 265.5 | 241.8 | 186.7 | 278.6 | 317.8 |
| Percent | 89.8 | 86.5 | 80.0 | 93.9 | 98.1 |
| Mols of Olefin Reacted | 0.74 | 0.77 | 0.64 | 0.18 | 0.488 |
| Gms | 20.7 | 21.4 | 17.8 | 5.0 | 40.0 |
| Mols of Aromatic Reacted | 0.28 | 0.32 | 0.39 | 0.15 | 0.068 |
| Gms | 33.5 | 38.2 | 47.0 | 18.0 | 8.1 |
| Mols of Aromatic Reacted per Mol of Olefin | 0.38 | 0.42 | 0.61 | 0.84 | 0.14 |
| Composition of Product Resulting from: | | | | | |
| 1 M. olef. + 1 M. Aromatic— | | | | | |
| Gms | 27.9 | 25.0 | 19.0 | 13.0 | 9.9 |
| Mols | 0.19 | 0.17 | 0.13 | 0.09 | 0.045 |
| Mol percent Based on total— | | | | | |
| Olefin Reacted | 25.7 | 22.1 | 20.3 | 50.0 | 9.2 |
| Aromatic Reacted | 67.8 | 53.1 | 33.3 | 60.0 | 66.2 |
| 2 M. Olef. + 1 M. aromatic— | | | | | |
| Gms | 6.8 | 7.3 | 8.7 | 6.1 | |
| Mols | 0.04 | 0.04 | 0.05 | 0.04 | |
| Mol percent Based on total— | | | | | |
| Olefin Reacted | 11.8 | 11.0 | 15.4 | 42.0 | |
| Aromatic Reacted | 14.3 | 12.5 | 13.2 | 26.7 | |
| Aromatic Conversion, percent | 10.2 | 13.5 | 20.0 | 6.1 | 1.9 |
| Olefin Conversion, percent | 89.6 | 99.1 | 98.6 | 21.6 | 41.2 |
| Yield based on Aromatic Conversion | 82.1 | 65.6 | 46.5 | 86.7 | 66.2 |
| Yield based on Olefin Conversion | 37.5 | 33.1 | 45.7 | 92.0 | 9.2 |

Experiments 70, 68, and 69 illustrate temperature levels of 375° C., 425° C., and 475° C. all at 12,000 p. s. i. and approximately 2.4 HLSV. The increasing aromatic conversions obtained as the temperature is raised are self-explanatory as are the increasing olefin conversions. The selectivity of the reaction drops off somewhat as shown by the yield based on aromatic conversion, and very rapidly as shown by the yield based on olefin conversion.

Experiments 69 and 70 demonstrate the effect of lowering the hourly liquid space velocity for the reaction of cumene with ethylene at 475° C. and 12,000 p. s. i. The aromatic conversion is increased by lowering the space velocity but the selectivity of the reaction seems to be decreased slightly. The results obtained by reacting cumene with cyclohexene is listed as Experiment 72. The conversion is low and therefore the yield data questionable.

Example XII

The operating conditions and the results of reacting indan with ethylene and with 1-octene are given in Table XII.

The results of the reaction of indan with ethylene were previously described in Example IX. The reaction product, as noted there is 1-ethylindan. In Experiment 74 indan was reacted with 1-octene to produce 1-octylindan, which can be converted to a surface active agent by sulfonation followed by neutralization.

Example XIII

This example was carried out to demonstrate the applicability of the process of our invention to unsaturated hydrocarbons containing a carbon to carbon triple bond in contrast to the previous examples which were all carried out with an unsaturated hydrocarbon containing carbon to carbon double bonds. In this experiment a stainless steel reactor was utilized and its internal volume was filled with stainless steel turnings. During the processing period, 312.9 (3.4 mols) of toluene, and 22.1 (0.55 mols) of methyl acetylene were passed through the reactor at 1.88 HLSV, at 12,000 p. s. i., and at a contacting temperature of 454° C. The aromatic to

TABLE XII

[Indan + various olefins ≈3.0:1 mol ratio, 375–475° C., 500–12,000 p. s. i., ≈2.50 HLSV, and in the presence of copper pellets.]

| Run No. | 73 | 74 |
|---|---|---|
| Contacting Agent | Cu | Cu |
| Aromatic Charged | Indan | Indan |
| Gms | 288.8 | 844.0 |
| Mols | 2.45 | 7.15 |
| Olefin charged | $C_2=$ | 1-$C_8=$ |
| Gms | 23.2 | 160.2 |
| Mols | 0.83 | 1.43 |
| Mol Ratio Aromatic to Olefin | 3.0/1 | 5.0/1 |
| Experimental Conditions: | | |
| Furnace Temp., °C | 463 | 464 |
| Contact Temp., °C | 452 | 451 |
| Pressure, p. s. i. | 12,050 | 12,070 |
| H. L. S. V. | 2.38 | 2.44 |
| Liquid Product, Gms | 317.5 | 1,018.7 |
| Olefin Recovered: | | |
| Gms | 1.0 | 10.9 |
| Percent | 4.3 | 6.8 |
| Aromatic Recovered: | | |
| Gms | 215.2 | 690.1 |
| Percent | 74.5 | 81.8 |
| Mols of Olefin Reacted | 0.79 | 1.33 |
| Gms | 22.2 | 149.3 |
| Mols of Aromatic Reacted | 0.625 | 1.30 |
| Gms | 73.6 | 153.9 |
| Mols of Aromatic Reacted Per Mol of Olefin | 0.81 | 0.98 |
| Composition of Product Resulting from: | | |
| 1 M. olef. + 1 M. aromatic— | | |
| Gms | 47.6 | 111.5 |
| Mols | 0.325 | 0.485 |
| Mol Percent Based on total— | | |
| Olefin Reacted | 41.2 | 36.5 |
| Aromatic Reacted | 52.0 | 37.4 |
| 2 M. olef. + 1 M. aromatic— | | |
| Gms | 15.2 | 26.6 |
| Mols | 0.087 | 0.078 |
| Mol Percent Based on total— | | |
| Olefin Reacted | 22.0 | 11.7 |
| Aromatic Reacted | 13.9 | 6.0 |
| Aromatic Conversion, Percent | 25.5 | 18.2 |
| Olefin Conversion, Percent | 95.7 | 93.2 |
| Yield based on Aromatic Conversion | 65.9 | 43.4 |
| Yield based on Olefin Conversion | 63.2 | 48.2 | olefin mol ratio was 6.15/1. 332.2 grams of liquid product was recovered. From this liquid product there was separated no methyl-acetylene and 288.8 grams of toluene, 92.4% of that charged. 5.4 grams of butenyl benzene was recovered. Based on the 7.6% aromatic conversion and the 100% methylacetylene conversion, the weight per cent of the product amounted to 15.4 weight per cent based on aromatic conversion and 7.3 weight per cent based on olefin conversion.

We claim as our invention:

1. A process for producing a side chain alkylated aromatic compound which comprises compressing, in the absence of external heating, an unsaturated hydrocarbon and an aromatic compound selected from the group consisting of carbocyclic and heterocyclic aromatic ring compounds having attached to a nuclear carbon atom, a saturated carbon atom to which is attached at least one hydrogen atom, the mol ratio of aromatic compound to unsaturated hydrocarbon being greater than about 1.0, thereafter thermally and noncatalytically reacting the unsaturated hydrocarbon with the aromatic compound at the saturated carbon atom, said reaction being carried out at a pressure greater than about 1000 p. s. i., at a temperature from about 350° to about 500° C., and at an hourly liquid space velocity from about 0.1 to about 10, and thereafter recovering the side chain alkylated resultant product.

2. The process of claim 1 further characterized in that the unsaturated hydrocarbon contains an ethylenic group.

3. The process of claim 1 further characterized in that the unsaturated hydrocarbon comprises an olefinic hydrocarbon.

4. The process of claim 1 further characterized in that said unsaturated hydrocarbon comprises a monoolefin.

5. The process of claim 1 further characterized in that said unsaturated hydrocarbon comprises a monoolefin containing a terminal double bond.

6. The process of claim 1 further characterized in that said unsaturated hydrocarbon comprises ethylene.

7. The process of claim 1 further characterized in that said unsaturated hydrocarbon contains an acetylenic group.

8. A process which comprises reacting an aromatic compound having the following structure:

where A represents a carbocyclic aromatic radical and R is selected from hydrogen and a nonolefinic organic radical attached to the indicated alpha carbon atom through a carbon atom, with a compound selected from the group consisting of olefinic and acetylenic hydrocarbons, at condensation conditions, the condensation conditions including compressing said reactants containing a molar excess of aromatic compound, in the absence of external heating, thereafter thermally and noncatalytically subjecting said compounds to reaction at a pressure greater than about 1000 p. s. i., at a temperature from about 350° to about 500° C., and at an hourly liquid space velocity from about 0.1 to about 10, to effect condensation of the unsaturated hydrocarbon with the carbocyclic aromatic compound at said saturated carbon atom.

9. The process of claim 8 further characterized in that the unsaturated hydrocarbon contains an ethylenic group.

10. The process of claim 8 further characterized in that the unsaturated hydrocarbon comprises an olefinic hydrocarbon.

11. The process of claim 8 further characterized in that said unsaturated hydrocarbon comprises a monoolefin.

12. The process of claim 8 further characterized in that said unsaturated hydrocarbon comprises a monoolefin containing a terminal double bond.

13. The process of claim 8 further characterized in that said unsaturated hydrocarbon comprises ethylene.

14. The process of claim 8 further characterized in that said unsaturated hydrocarbon contains an acetylenic group.

15. A process for producing side chain alkylated aromatic hydrocarbons which comprises compressing, in the absence of external heating, an unsaturated hydrocarbon and an alkylaromatic hydrocarbon having at least one hydrogen atom attached to the alpha carbon atom, said mixture containing a molar excess of the alkylaromatic hydrocarbon during the reaction, thereafter thermally and noncatalytically reacting said unsaturated hydrocarbon with the alkylaromatic hydrocarbon, at a pressure greater than about 1,000 p. s. i., at a temperature from 350° to about 500° C., and at an hourly liquid space velocity of from about 0.1 to about 10, and thereafter recovering the side chain alkylated resultant products.

16. The process of claim 15 further characterized in that the unsaturated hydrocarbon comprises an olefinic hydrocarbon.

17. The process of claim 15 further characterized in that said unsaturated hydrocarbon comprises a monoolefin.

18. The process of claim 15 further characterized in that said unsaturated hydrocarbon comprises a monoolefin containing a terminal double bond.

19. The process of claim 15 further characterized in that said unsaturated hydrocarbon comprises ethylene.

20. The process of claim 15 further characterized in that said unsaturated hydrocarbon contains an acetylenic group.

References Cited in the file of this patent

UNITED STATES PATENTS

| | | |
|---|---|---|
| 2,373,303 | Frey et al. | Apr. 10, 1945 |
| 2,448,641 | Whitman | Sept. 7, 1948 |

OTHER REFERENCES

Sachanen et al., Indust. and Eng. Chemistry, vol. 33, No. 12, pages 1540–1544, December 1941.